United States Patent [19]

Ozaki et al.

[11] 4,115,324
[45] Sep. 19, 1978

[54] CATALYST FOR TREATING HEAVY OILS

[75] Inventors: Hiromi Ozaki, Urawa; Mamoru Yamane, Kiyose; Yoshihito Satomi, Ageo; Teruo Suzuka, Kawaguchi; Toshinobu Miyake, Urawa; Mizuho Hirato, Hitachi, all of Japan

[73] Assignees: Nippon Mining Co., Ltd; Hitachi, Ltd., both of Tokyo, Japan

[21] Appl. No.: 805,355

[22] Filed: Jun. 10, 1977

[51] Int. Cl.$^2$ ............... B01J 29/10; B01J 29/20; B01J 23/40; B01J 23/74
[52] U.S. Cl. ................... 252/459; 252/472; 208/121
[58] Field of Search ............... 252/459, 457, 448, 449, 252/472; 208/121

[56] References Cited

U.S. PATENT DOCUMENTS

| 1,331,904 | 2/1920 | Elder | 252/459 X |
| 2,220,261 | 11/1940 | Michael et al. | 252/472 |
| 4,046,670 | 9/1977 | Seguchi et al. | 208/121 X |

Primary Examiner—Carl F. Dees
Attorney, Agent, or Firm—Oblon, Fisher, Spivak, McClelland & Maier

[57] ABSTRACT

A catalyst suitable for cracking heavy oils can be obtained by baking nickel-containing ore at a temperature between about 850° C and about 1200° C.

4 Claims, No Drawings

CATALYST FOR TREATING HEAVY OILS

FIELD OF THE INVENTION

This invention concerns a catalyst for treating heavy oils and, more particularly, a catalyst for cracking heavy oils such as residues of atmospheric distillation and vacuum distillation, as well as crude oils.

BACKGROUND OF THE INVENTION

It has recently been proposed a process for removing heavy metals from petroleum hydrocarbons containing such heavy metals and cracking the petroleum hydrocarbons by contacting them, at a temperature within a specified range, with a substance obtained from nickel ore baked at a temperature between 350° C and 600° C (refer to Japanese Patent Laid Open Publication No. 10,202/1974). The substance for use with the above process prepared by baking the nickel ore at a temperature between 350° C and 600° C has, however, only an insufficient physical strength and easily pulverizes to result a significant catalyst loss due to the pulverization in the process of cracking heavy oils using the above substance as the catalyst. The use of the above substance as the catalyst for cracking the heavy oils is therefore economically disadvantageous.

SUMMARY OF THE INVENTION

We have made a study for eliminating the defect in the above conventional catalyst and, as the result, found that baked products obtained from natural nickel-containing ore by subjecting it to grinding and pelletizing and then to baking at a temperature between about 850° C and about 1200° C can be used effectively as a catalyst for the cracking treatment of heavy oils in even the reaction under an atmospheric pressure.

It is, accordingly, an object of this invention to provide a catalyst suited to the cracking treatment of the heavy oils, easy to prepare, having a sufficient physical strength and facilitating the operation in the reaction using such catalyst. Other objects of this invention will be apparent from the descriptions to be made hereinafter.

DETAILED DESCRIPTION OF THE INVENTION

The nickel-containing ore to be used for the preparation of the catalyst according to this invention includes silicate type nickel oxide ore with high silica and magnesia contents usually referred to as garnierite and iron oxide type nickel oxide ore with a high iron content usually referred to as laterite. According to this invention, the nickel-containing ore is usually pulverized into particles, preferably, below 15$\mu$ in size and pelletized to a certain shape, preferably, between 100 - 700$\mu$ in size and then baked at a temperature between about 850° C and about 1200° C, preferably, within the range of 1100° C - 1200° C. The baked products thus obtained are used as the catalyst. The temperature for the baking of the above nickel-containing ore is specified as between about 850° C and about 1200° C, because the resultant baked products as a catalyst increase physical strength and reduce pulverization percentage to below 40% at a baking temperature in excess of 850° C and, on the other hand, shown a significant decrease in the catalytical activity at a baking temperature above 1200° C. The baking is effected in an oxidizing atmosphere for at least 1 hour and, preferably, about 3 hours. Baking under a reducing atmosphere should be avoided since it tends to result sintering for iron in the ore to thereby reduce the catalytical activity of the baked products. The term "pulverization percentage" used herein means percentage (by weight) of the catalysts less than 100 mesh in particle size which are resulted by placing 20 g of catalyst material of 60 - 100 mesh size in a ball mill 110 mm in diameter and grinding it for 20 minutes. As described before, the pulverization percentage has an important effect on the performance of the catalyst for cracking the heavy oils and the substance with a lower pulverization percentage is practically useful as the catalyst.

In using the baked products prepared by baking the nickel-containing ore as the catalyst for treating the heavy oils, the heavy oils and the baked products are, preferably, contacted under reaction conditions conventionally employed for the cracking of petroleum hydrocarbons such as under a fluidized system. Through the above contact, it is considered, the nickel ore conducts cracking and selective coking for the heavy hydrocarbons as constituents of the heavy oils and concentrates the heavy metals localized in the heavy hydrocarbons into the cokes thereby removing the metals from the heavy oils. The application of nickel-containing ore not yet baked is, however, undesired from industrial point of view since the nickel therein has an extremely high coking activity and results a high coke yield. Baking of the nickel-containing ore at a temperature between about 850° C and about 1200° C somewhat eliminates the acidic sites in the catalyst of the resultant baked products to suppress the yield of cokes thereby significantly improving the selectivity for the light oils (light oil yield/light oil + cokes yields) although lowering the light oil yield. The baking at a temperature above 1200° C, however, causes reduction in the catalytical activity of the baked products as described above, which is considered to be attributable to the elimination of cracking activity for the heavy oils due to the substantial elimination of the acidic sites in the catalyst by the baking. Referring to the physical strength of the catalyst, it increases remarkably by the baking at a temperature above 850° C but no substantial increase can be seen in the baking at a temperature above 1200° C.

In cracking the heavy oils using the catalyst according to this invention, the catalyst and the heavy oils are contacted as described before, whereby the contact is preferably effected at a temperature between about 350° C and 550° C for several seconds to several minutes and with a catalyst to heavy oil ratio of about 1 - 15. The above catalytic reaction can be proceeded satisfactorily under an atmospheric or a slightly increased pressure.

As foregoings, according to this invention, a heavy oil treating catalyst excellent both in physical strength and catalytical activity and with low pulverization percentage can be provided by a simple process of baking, under a temperature condition in a specified range, nickel-containing ore which is abundant as natural resources.

This invention will now be described more specifically referring to examples but it is to be understood that the invention is no way restricted to such examples.

The percentage in each Example indicates by weight unless specifically mentioned.

EXAMPLE 1

Silicate type nickel ore containing 2.9% Ni, 13.4% Fe, 29.8% MgO, 38.5% SiO$_2$ and 1.9% Al$_2$O$_3$ was finely ground and formed through crush pelletization into particle 200μ in average diameter. They were baked at each temperature shown in table 1 below for 3 hours, respectively.

Each 10 cc of the ore baked products prepared by the above baking was charged respectively into a tubular reactor, through which vacuum gas oil having specific gravity of 0.8859 (15/4° C) and prepared from Kuwait crude oils through vacuum distillation and flown down to react at WHSV of 2 for 5 minutes at a reaction temperature of 500° C. The results are collectively shown in the table 1, together with the results of the strength test for the catalyst of the above baked products. The results of the strength test are given as pulverization percentage obtained after grinding a certain amount of the catalyst in a ball mill.

Table 1

| Baking temperature (° C) | Pulverization percentage (wt%) | Acidity (m eq./g) | Light oil yield (wt%) | Cokes Yield (wt%) | Selectivity |
|---|---|---|---|---|---|
| 500 | 88 | 0.157 | 27.7 | 35.2 | 0.44 |
| 800 | 41 | 0.120 | 27.0 | 28.0 | 0.49 |
| 850 | 36 | 0.089 | 23.2 | 18.8 | 0.55 |
| 900 | 34 | 0.065 | 20.1 | 14.7 | 0.58 |
| 1000 | 27 | 0.041 | 18.4 | 10.3 | 0.64 |
| 1100 | 23 | 0.012 | 14.4 | 3.7 | 0.80 |
| 1200 | 19 | 0.009 | 10.5 | 1.2 | 0.90 |
| 1300 | 16 | difficult to measure | 7.9 | 0.7 | 0.92 |

Remarks
(1) Light oil yield represents the yield for the products with b.p. less than 300° C.
(2) Selectivity means $\frac{\text{light oil (yield)}}{\text{light oils (yield)} + \text{cokes (yield)}}$ As can be seen from the table above, the pulverization percentage of the catalyst increases as the baking temperature decreases below 850° C and the light oil yield is significantly reduced as the baking temperature increases above 1200° C. Thus, it will be apparent that the nickel-containing ore should be baked at a temperature between about 850° C and about 1200° C.

EXAMPLE 2

Iron oxide type nickel ore (Parawan laterite) containing 1.2% Ni, 56.5% Fe, 0.8% MgO, 1.9% $SiO_2$ and 3.1% $Al_2O_3$ was formed in an extrusion molding machine into cylinders of 1.5 mm in diameter and 3 - 4 mm in length and then baked for 3 hours at 500° C and 1000° C, respectively. Each 10 cc of the ore baked products prepared by the above baking was charged into a tubular reactor, through which residues obtained from Kuwait crude oils through atmospheric distillation and containing 40 ppm vanadium, 10 ppm nickel and 9.4% residual carbon and having a specific gravity of 0.9574 (15/4° C) was flown down to react at WHSV of 2 for 5 minutes at a reaction temperature of 500° C respectively. The results are shown in table 2 below, together with the hardness for the ore baked products obtained by the above baking.

Table 2

| Baking temperature (° C) | Hardness (kg) | Light oil yield (wt%) | Cokes yield (wt%) |
|---|---|---|---|
| 500 | 0.98 | 39.6 | 37.8 |
| 1000 | 7.51 | 30.0 | 31.8 |

Remark:
(1) Hardness was measured by using a Kiya hard meter.

As can be seen from the table 2 above, while the ore baked products baked at 500° C exhibit a considerably high catalytical activity (cracking activity), they have extremely low hardness and are suited to practical use.

EXAMPLE 3

Silicate type nickel ore containing 2.9% Ni, 12.4% Fe, 23.3% MgO, 47.8% $SiO_2$ was finely ground and formed through crush pelletization into pellets 530μ in average diameter and they were baked at 500° C, 900° C and 1200° C, respectively. The baked products were arranged as a fluidized-bed in a reactor of 100 mm $\phi$ in diameter, where the feed rate of these products was controlled so as to be equivalent to the discharge rate of them and contacted in a once through process with Kuwait asphalt at a specific gravity of 1.03 (15/4° C) and containing 5.6% asphalten and 108 ppm vanadium, at a reaction temperature of 500° C, with the feed rate of a baked product/the feed rate of asphalt ratio = 1.5 (wt/wt) and with a gas residence time of 0.7 second while using steam as fluidizing medium. Cracking rate for asphalten and removal rate of vanadium and pulverization percentage for the baked products are shown in table 3 below. The same procedures as in this example were repeated excepting that inactive alumina (α-alumina) having the same distribution of particle size as that in the above baked products were used in place of these products as reference example, and the results are also shown in the table 3 for the reference.

Table 3

| Baking temperature for baked ores | Cracking rate for asphalten | Removal rate of vanadium | Pulverization % for baked product |
|---|---|---|---|
| 500° C | 96% | 91% | 4.3 |
| 900° C | 87% | 90% | 0.1 |
| 1200° C | 82% | 79% | trace |
| Reference example (α-alumina) | 61% | 68% | trace |

As can be seen from the table 3 above, the baked products according to this invention possess a remarkable cracking activity, a high metal removal rate and a well-improved hardness concurrently.

Cracking rate for asphalten =

$$\frac{\text{asphalten in material oil (\%)} - \text{asphalten in reacted oil (\%)}}{\text{asphalten in material oil (\%)}} \times 100$$

Removal rate of vanadium =

$$\frac{\text{vanadium in material oils (ppm)} - \text{vanadium in reacted oil (ppm)}}{\text{vanadium in material oils (ppm)}} \times 100$$

Pulverization percentage for baked product =

$$\frac{\text{collection rate of pulverized baked product from transfer line above the reactor (kg/H)}}{\text{feed rate of baked product (kg/H)}} \times 100$$

wherein reacted oils mean the sum of cracked oils and uncracked oils.

What is claimed is:

1. A catalyst applicable to the cracking treatments for heavy oils, which is obtained by grinding nickel-containing ore selected from the group consisting of garnierite and laterite, forming the ground ore through pelletization and baking the formed ore in an oxidizing atmosphere at a temperature in the range of about 850° C to above 1200° C.

2. The catalyst as defined in claim 1, wherein said baking treatment is effected at a temperature within the range of 1100° C – 1200° C.

3. A catalyst according to claim 1 wherein said nickel-containing ore is laterite.

4. A catalyst according to claim 1 wherein said nickel-containing ore is garnierite.

* * * * *